US011373290B1

(12) United States Patent
Johannesson et al.

(10) Patent No.: US 11,373,290 B1
(45) Date of Patent: Jun. 28, 2022

(54) DETECTION OF DEVIATIONS IN PACKAGING CONTAINERS FOR LIQUID FOOD

(71) Applicant: Tetra Laval Holdings & Finance S.A., Pully (CH)

(72) Inventors: Peter Johannesson, Malmö (SE); Erik Bergvall, Eslöv (SE)

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 17/615,960

(22) PCT Filed: Jun. 15, 2020

(86) PCT No.: PCT/EP2020/066516
§ 371 (c)(1),
(2) Date: Dec. 2, 2021

(87) PCT Pub. No.: WO2020/254260
PCT Pub. Date: Dec. 24, 2020

(30) Foreign Application Priority Data

Jun. 18, 2019 (EP) ..................................... 19180965

(51) Int. Cl.
*G06T 7/00* (2017.01)
(52) U.S. Cl.
CPC .. *G06T 7/0008* (2013.01); *G06T 2207/20081* (2013.01); *G06T 2207/20084* (2013.01); *G06T 2207/30128* (2013.01)

(58) Field of Classification Search
CPC ......... G06T 7/0008; G06T 2207/20081; G06T 2207/20084; G06T 2207/30128
See application file for complete search history.

(56) References Cited

U.S. PATENT DOCUMENTS

2016/0063734 A1* 3/2016 Divakaran ............. G06V 10/50
382/110

OTHER PUBLICATIONS

Yuhuan Liu et al.; Defect Inspection of Medicine Vials Using LBP Features and SVM Classifier; 2017 2nd International Conference on Image, Vision and Computing (ICIVC); Jun. 2, 2017; pp. 41-45 (Year: 2017).*

(Continued)

*Primary Examiner* — Ping Y Hsieh
(74) *Attorney, Agent, or Firm* — Renner, Otto, Boisselle & Sklar, LLP

(57) ABSTRACT

A monitoring system implements a method for versatile and efficient training of a machine learning-based model for subsequent detection and grading of deviations in packaging containers for liquid food in a manufacturing plant. The method comprises creating a virtual model of a packaging container or of a starting material for use in producing the packaging container; obtaining probability distributions for features that are characteristic of a deviation type; producing reproductions of the virtual model with deviations included among the reproductions in correspondence with the probability distributions; associating gradings with the reproductions; and inputting the reproductions and the associated gradings for training of the machine learning-based model for subsequent detection and grading of an actual deviation in image data acquired in the manufacturing plant.

15 Claims, 6 Drawing Sheets

(56) References Cited

OTHER PUBLICATIONS

International Search Report dated Sep. 21, 2020, for priority International Patent Application No. PCT/EP2020/066516.
Yuhuan Liu et al.; Defect Inspection of Medicine Vials Using LBP Features and SVM Classifier; 2017 2nd International Conference on Image, Vision and Computing (ICIVC); Jun. 2, 2017; pp. 41-45.

* cited by examiner

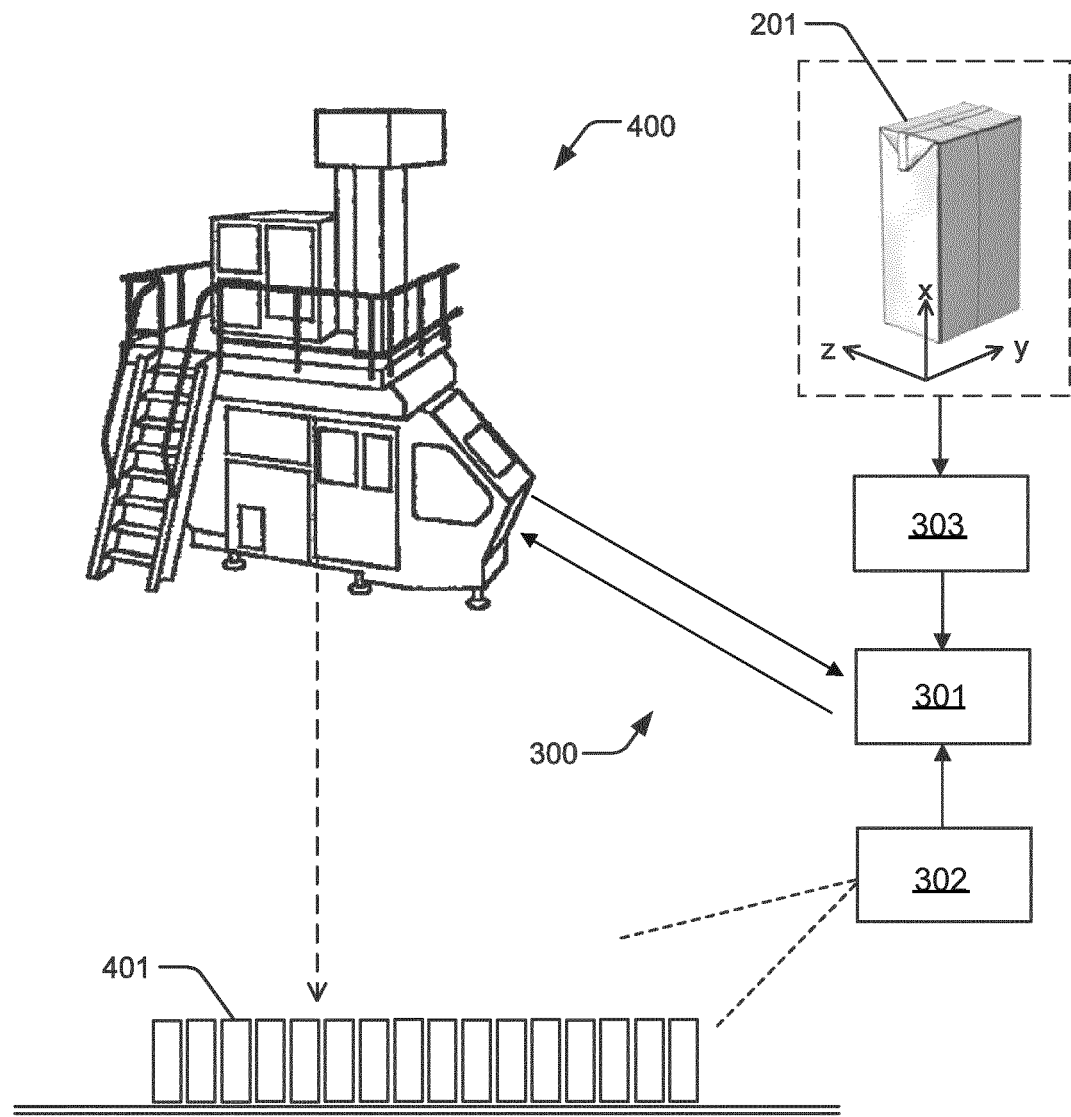
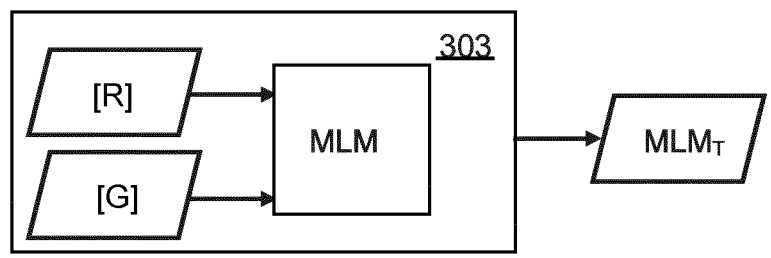
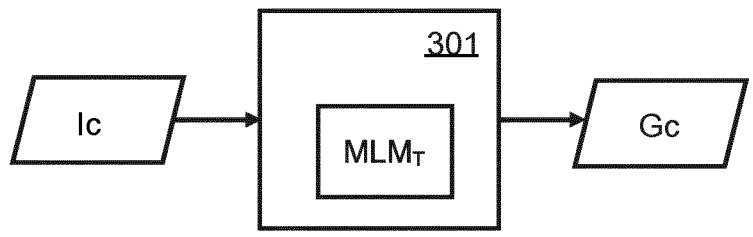
Fig. 1a
Fig. 1b
Fig. 1c

DETECTION OF DEVIATIONS IN PACKAGING CONTAINERS FOR LIQUID FOOD

TECHNICAL FIELD

The present disclosure generally relates to techniques for detection of deviations in packaging containers for liquid food, and in particular detection based on image data captured in a manufacturing plant during production of the packaging containers.

BACKGROUND ART

Detection of deviations, such as defects or other deviations from an expected product configuration is critical in production lines, such as in the manufacturing of sealed packaging containers for liquid food in a filling machine or other machines used in production of such packaging containers, in order to configure optimal operating settings and ensuring a desired performance over a period of time. Deviations in the produced packaging containers may lead to variations in the appearance of the packaging containers, e.g. inconsistencies that may cause concern from the consumer point-of-view, or cause sub-optimal performance, e.g. in terms of packaging container integrity or stability. There is a need for efficient, automated and reliable tools and procedures for quality control, as well as identification and grading of deviations in packaging containers for liquid food in a manufacturing plant. Such tools should preferably have a minimum impact on the production in the manufacturing plant and require a minimum amount of resources. It is also preferable to minimize the amount of manual labor required for setting up and operating the tools.

SUMMARY

It is an objective of the invention to at least partly overcome one or more limitations of the prior art.

One objective is to provide for reliable and automated detection of deviations in packaging containers for liquid food.

A further objective is to provide a resource-efficient technique for detection of deviations in packaging containers.

Yet another objective is to provide for labor-efficient preparation of such a technique for identification of deviations in packaging containers.

One or more of these objectives, as well as further objectives that may appear from the description below, are at least partly achieved by a method of detecting deviations in packaging containers for liquid food in a manufacturing plant, a computer-readable medium, and a system according to the independent claims, embodiments thereof being defined by the dependent claims.

A first aspect of the invention is a method of detecting deviations in packaging containers for liquid food in a manufacturing plant. The method comprises: creating a virtual model of a packaging container or of a starting material for use in producing the packaging container; obtaining one or more probability distributions for features that are characteristic of a deviation type; producing reproductions of the virtual model with deviations of the deviation type, wherein said deviations are included among the reproductions in correspondence with the one or more probability distributions for the features; associating gradings with the reproductions; and inputting the reproductions and the associated gradings for training of a machine learning-based model for subsequent detection and grading of an actual deviation in the packaging containers or the starting material, based on image data of the packaging containers or the starting material acquired in the manufacturing plant.

The use of a machine learning-based model enables reliable and automated detection of deviations provided that the machine learning-based model is trained on relevant and accurate training data. The first aspect trains the machine learning-based model at least partly on synthetic data, which is produced in the form of reproductions of a virtual model of the packaging container or of the starting material to be monitored. The use of a virtual model facilitates the acquisition of training data by reducing the need to acquire and grade image data of all possible deviations of a deviation type in actual packaging containers or starting material in the manufacturing plant. Thus, the first aspect may serve to reduce both time and labor needed for acquiring training data for the machine learning-based model. The use of the virtual model also improves versatility by providing control of the deviations that are included in the reproductions. For example, the virtual model makes it possible to expand the range of deviations of a deviation type to be included among the reproductions, and/or to expand the number of different deviations of a deviation type to be included among the reproductions, and/or to include more than one deviation type. The use of the one or more probability distributions provides automatic control of the deviations that are included among the reproductions and may be applied to ensure that the deviations in the reproductions are well-matched to actual deviations that are likely to occur in the manufacturing plant. This may result in a more efficient training of the machine learning-based model and/or a better performance of the machine learning-based model when operated on image data of actual packaging containers and/or starting material in the manufacturing plant.

In one embodiment, the one or more probability distributions define probability values for feature values of a respective feature that is characteristic of the deviation type.

In one embodiment, the producing further comprises: matching an occurrence of a feature value of the respective feature among the reproductions to a corresponding probability value given by the one or more probability distributions.

In one embodiment, the features comprise one or more weights of a set of predefined basis functions for the deviation type.

In one embodiment, the producing further comprises: determining, as a function of the one or more probability functions, a respective weight value for predefined basis functions in the set of predefined basis functions; and combining the predefined basis functions scaled with the respective weight value to generate a functional representation of a deviation to be included among the reproductions, and adapting the virtual model to the functional representation to include the deviation.

In one embodiment, the predefined basis functions in the set of predefined basis functions are linearly independent and/or mutually orthogonal.

In one embodiment, the predefined basis functions in the set of predefined basis functions correspond to principal components given by Principal Component Analysis, PCA.

In one embodiment, each of the deviations is defined by one or more feature values of said features, wherein the associating comprises, for a respective reproduction, mapping the one or more feature values to a grading database that associates gradings with feature values, and determining, based on the mapping, a grading for the respective reproduction.

In one embodiment, the virtual model is created in a virtual coordinate system, wherein said producing further comprises: defining a deviation region on the virtual model, introducing a controlled deviation in the deviation region with a defined geometry and a location in the virtual coordinate system to represent one or more of the features that are characteristic of the deviation type; and producing a reproduction of the virtual model with the controlled deviation.

In one embodiment, the method further comprises defining a virtual camera position in the virtual coordinate system in relation to the virtual model so that a viewpoint of the reproduction corresponds to a viewpoint from a camera position onto the packaging containers or the starting material for said subsequent detection at the manufacturing plant.

In one embodiment, the method further comprises: determining a time stamp for the actual deviation; determining, based on the time stamp, associated production parameters of the manufacturing plant, and correlating the time stamp, the grading and the deviation type with the production parameters.

In one embodiment, the method further comprises: communicating control instructions to a machine in the manufacturing plant comprising modified production parameters according to the grading and/or the deviation type.

In one embodiment, the method further comprises: causing an alert notification as a function of the grading.

In one embodiment, the deviation type comprises any of: wrinkles in a material of the packaging containers or in the starting material, unsealed flaps of the packaging containers, torn or cloudy holes in the packaging containers or the starting material, dents or bumps in the packaging containers, delamination of the packaging containers or in the starting material, and flawed patterning and/or coloring and/or holographic or metallized film of a surface of the packaging containers or the starting material.

A second aspect of the invention is a computer-readable medium comprising computer instructions which, when executed by a processor, cause the processor to perform the method of the first aspect or any of its embodiments.

A third aspect of the invention is a system for detecting deviations in packaging containers for liquid food produced in a manufacturing plant, the system comprising a processor configured to perform the method of the first aspect or any of its embodiments. The system may further comprise at least one imaging device configured to capture and provide the image data. The processor may be included in a monitoring device and operatively connected to a communication interface which is configured for connection to the at least one imaging device.

Still other objectives, as well as features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings.

FIG. 1a is a schematic illustration of a system for detection of deviations in packaging containers, FIG. 1b shows an example of training a machine learning model, and FIG. 1c shows an example of using a trained machine learning model.

DETAILED DESCRIPTION

Figure 2A:
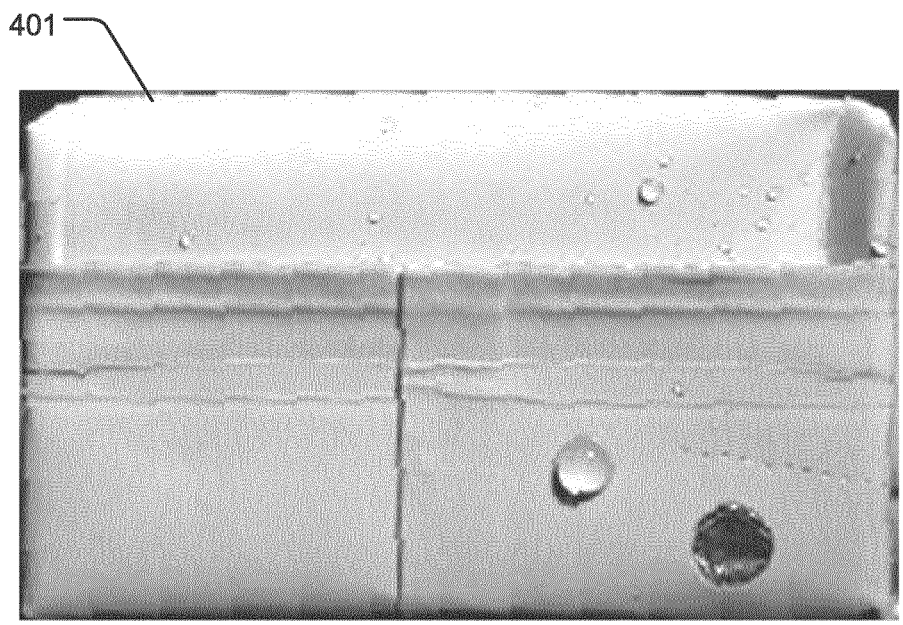
FIG. 2a is a top-down view of a packaging container having a deviation in the top-right corner.

Embodiments will now be described more fully hereinafter with reference to the accompanying drawings, in which some, but not all, embodiments are shown. Indeed, the invention may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, the term "and/or" comprises any and all combinations of one or more of the associated listed items. Further, a "set" of items is intended to imply the provision of one or more items.

As used herein, "liquid food" refers to any food product that is non-solid, semi-liquid or pourable at room temperature, including beverages, such as fruit juices, wines, beers, sodas, as well as dairy products, sauces, oils, creams, custards, soups, etc, and also solid food products in a liquid, such as beans, fruits, tomatoes, stews, etc.

As used herein, "packaging container" refers to any container suitable for sealed containment of liquid food products, including but not limited to containers formed of packaging laminate, e.g. cellulose-based material, and containers made of or comprising plastic material.

As used herein, "starting material" refers to any base material that is processed to form part of a packaging container, including but not limited to sheet material of packaging laminate, closures (caps, lids, covers, plugs, foil, etc.) for closing the packaging container, labels for attachment to the sheet material or the packaging container.

As used herein, a "reproduction" is a photorealistic or non-photorealistic image which is produced to represent a virtual model, or part thereof. The reproduction may be produced by conventional ray casting or ray tracing, as well as rendering techniques that also account for diffraction, e.g. wave optics, GTD algorithms (Geometrical Theory of Diffraction), PTD algorithms (Physical Theory of Diffraction), Physical Optics (PO), Boundary Element Method (BEM), etc. The reproduction may be two- or three-dimensional.

As used herein, the term "deformation" is intended to generally designate any distortion of or deviation from an acceptable or ideal appearance of packaging containers. Thus, a deformation is not restricted to alterations of form or shape but also includes alterations in surface structure, surface patterning, surface coloring, etc.

As used herein, the term "basis functions" is used in its ordinary meaning and refers to linearly independent elements that span a function space so that every function in the function space can be represented as a linear combination of the basis functions. The basis functions may be represented as vectors, and the function space may be a vector space of any dimension.

Like reference signs refer to like elements throughout.

FIG. 1a is a schematic illustration of a system 300 for detection of deviations in packaging containers 401 for liquid food produced in a manufacturing plant. The containers 401 are sealed to contain the liquid food and may be at least partly made of a laminated or non-laminated paperboard material or a plastic material. For example, the containers 401 may be cartons or bottles, which are well-known in the art.

The system 300 may be arranged to detect the deviations upstream, within or downstream of a machine 400 in the plant. The machine 400 may be a machine for feeding and/or manipulating a starting material for the container 401 or part thereof, a filling machine, a capping machine, an accumulator machine, a straw application machine, a secondary packaging machine, or any other type of packaging machine that is deployed in manufacturing plants for packaging of liquid food.

The system 300 comprises a monitoring or inspection device 301 which is configured to detect and signal deviations occurring during production of the packaging containers 401, and an imaging device 302 which is arranged and operated to capture image data of the containers 401 or the starting material, for use by the monitoring device 301. The imaging device 302 may be arranged along any part of production line(s) in the manufacturing plant. It is also conceivable that a plurality of imaging devices 302 may be arranged to capture the image data from different parts of the production line(s) and/or from different angles in relation to the containers 401, and/or with different exposure settings or image processing parameters. The image data may thus comprise multiple streams of image data captured from such a plurality of imaging devices 302.

The image data may represent the external appearance of the containers 401 or the starting material, or part thereof. In an alternative, the imaging device 302 may be configured to capture images representing internal features of the containers 401, e.g. one or more cross-sectional images. The image data may be one-dimensional, two-dimensional or three-dimensional and comprise any number of channels, e.g. a grayscale channel and/or any number of color channels.

The system 300 may be deployed for quality monitoring, for example to indicate packaging containers and/or starting material to be discarded for lack of quality, or to sort packaging containers 401 according to different quality gradings. Alternatively or additionally, the system 300 may be deployed to provide instructions for a control system of one or more machines 400 in the manufacturing plant. For example, the instructions may cause the control system to interrupt production in a machine or to reconfigure a machine by adjusting one or more of its current settings.

One aspect of the present disclosure relates to a method, which may be implemented by the system 300 and comprises: creating a virtual model of a packaging container or of a starting material for use in producing the packaging container; obtaining one or more probability distributions for features that are characteristic of a deviation type; producing reproductions of the virtual model with deviations of the deviation type, wherein the deviations are included among the reproductions in correspondence with the one or more probability distributions for the features;

associating gradings with the reproductions; and inputting the reproductions and the associated gradings for training of a machine learning-based model for subsequent detection and grading of an actual deviation in the packaging containers or the starting material, based on image data of the packaging containers or the starting material acquired in the manufacturing plant.

In this aspect, the machine learning-based model (abbreviated MLM in the following) is trained by use of reproductions of a virtual model. The virtual model is a computer-based representation of the packaging container (or a starting material), and the reproductions are thus artificially created or "synthetic". This approach of training the MLM on synthetic data instead of (or in addition to) image data of real objects, for example captured in a real-world production environment, reduces the work load and time required for training the MLM by obviating the need to actually produce the deviations in real containers, e.g. by operating a production line. Thus, the MLM may be optimized quicker and with less resources. Further, the synthetic data may be adapted to the desired capability of the trained MLM. Still further, the use of synthetic data enables improved detection of various deviations since the synthetic data may be simply modified to include a wider range of controlled deformations, for example to represent variants within a deviation type and/or or to include different deviation types.

As used herein, a "deviation type" refers to a categorization or classification of the deviations. In some embodiments, exemplified further below, a deviation may belong to a specific deviation type if the deviation can be represented by a predefined set of basis functions. In some embodiments, a deviation type may be associated with a specific location on the container (or the starting material) and/or by a specific deformation. For example, dents, wrinkles, unsealed flaps, torn or cloudy holes, delamination, flawed color and/or pattern of a surface, a flaw in a holographic or metallized film attached to or otherwise included on a surface, imperfect embossing or folding, etc, may belong to different deviation types. It is conceivable that a deviation type may be associated with a specific deformation, irrespective of location. It is also conceivable that a deviation type may be associated with at a specific location, irrespective of deformation. Many variants are conceivable and readily appreciated by the person skilled in the art.

Figure 2B:
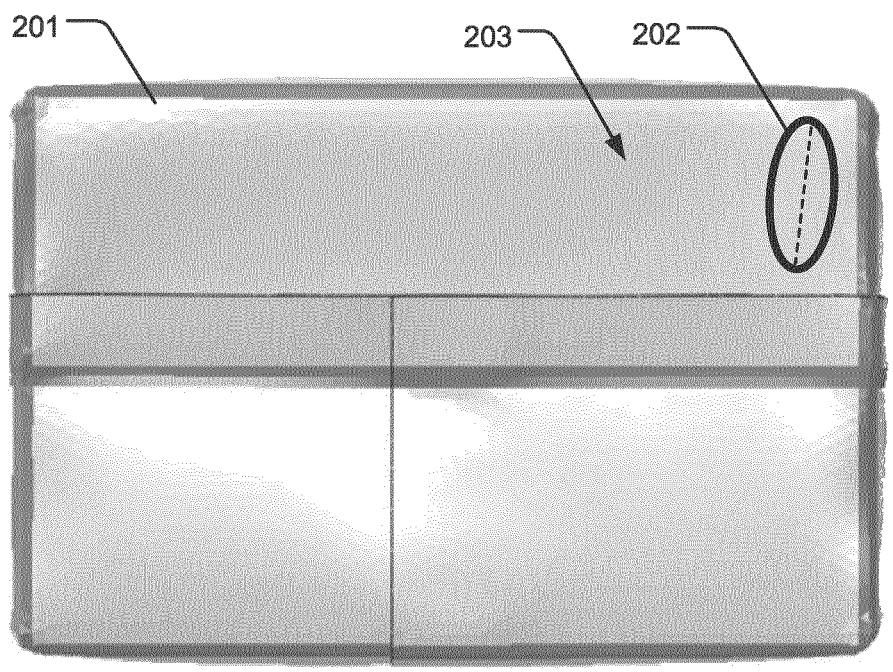
FIG. 2b is a top-down view of a virtual model of a packaging container with a deviation region in the top-right corner.
Figure 2C:
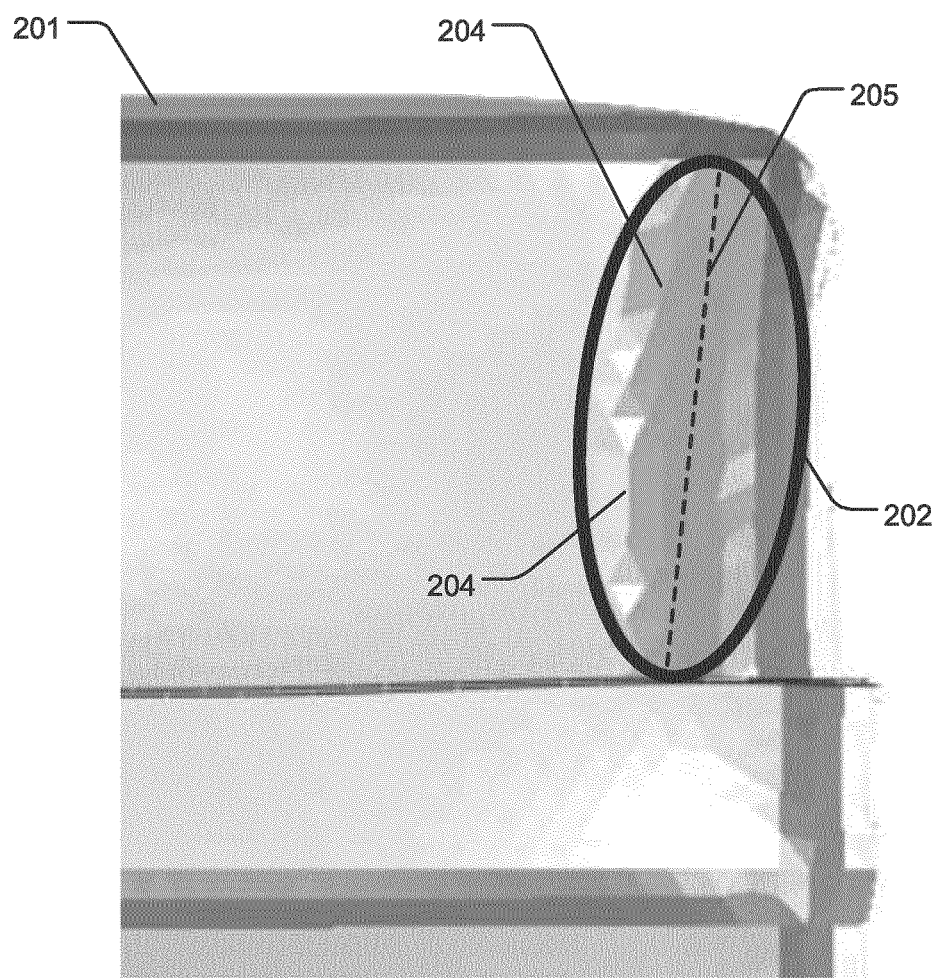
FIG. 2c is an enlarged view of the virtual model of the packaging container having a controlled deviation in the deviation region indicated in FIG. 2b.

Reverting to the example in FIG. 1a, the system 300 may comprise a training device 303, which is configured to create a virtual model 201 of a packaging container 401 in a virtual coordinate system (x,y,z), and define a deviation region 202 on a surface 203 of the virtual model, as schematically illustrated in FIG. 2b which is a top-down view of such a virtual model 201 of a container 401. FIG. 2a is corresponding top-down image of a real container 401 having a deviation in the top-right corner, in this example a dent/bump. The training device 303 is configured to create, in the deviation region 202, a defined deviation 204 having a defined geometry and coordinates in the virtual coordinate system to create a controlled deformation of the virtual model 201. FIG. 2c is an enlarged view of the virtual model 201 having a controlled deformation in the deviation region 202. In the illustrated example, a deformation line 205 has been defined to extend along the surface 203 of the virtual model 201, and the surface 203 has been folded along the deformation line 205 with a defined angle to form a concave and/or convex shape in the surface 203. The deviation region 202 may be placed at any part of the surface 203 of the virtual model 201 and the defined deviation 204 may have any geometry. The training device 303 is further configured to produce a reproduction of the virtual model 201 with the controlled deformation. As indicated in FIG. 1b, the MLM is loaded into the training device 303 and subjected to training. In the training, a large number of reproductions [R] and associated gradings [G] are input to the MLM, which thereby is caused to set its model parameters accordingly. The training results in a trained machine learning-based model, designated by $MLM_T$. As indicated in FIG. 1c, $MLM_T$ may then be used by the monitoring device 301 to generate a current grading Gc based on current incoming image data Ic captured by the imaging device 302 in FIG. 1a. The skilled person realizes that the reproductions [R] should correspond visually to the image data Ic to be processed by $MLM_T$.

The trained model $MLM_T$ may be stored locally on the monitoring device 301 or accessed remotely by the monitoring device 301, e.g. on a server. It is further conceivable that the monitoring device 301 is implemented on a server and is configured to communicate with the imaging device (s) 302, and optionally with the machine 400, from the server. Any suitable machine learning-based model known in the art may be used, including but not limited to an artificial neural network (ANN), a convolutional neural network (CNN) and a support vector machine (SVM), or any combination thereof. In one embodiment, the MLM incorporates a deep-learning based model.

Figure 3:
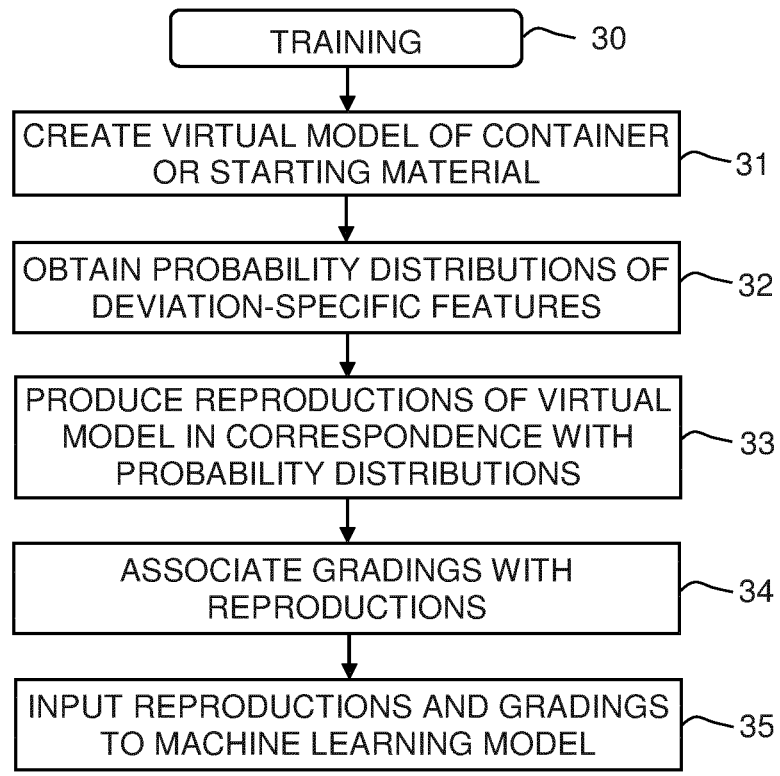
FIG. 3 is a flowchart of an example method for training a machine learning model.

A training method will now be exemplified with reference to the flow chart in FIG. 3. The illustrated method 30 comprises a step 31 of creating a virtual model of the packaging container 401 or the starting material. The virtual model may be exemplified by the virtual container 201 in FIG. 1a. Step 32 obtains a respective probability distribution for one or more features ("deviation-specific features") that are characteristic of a deviation type. The probability distribution is a discrete or continuous function that describes the likelihood of obtaining the different values that a feature may assume. In one embodiment, the features comprise measurable properties of a deviation, such as length, width, area, height, curvature, height variability, shape, location, etc. In other embodiments, to be described in detail below, the features comprise weights of basis functions that are specific to the deviation type. Step 33 produces the reproductions of the virtual model to include the respective feature value in correspondence with its probability distribution. For example, if a deviation is defined by two features, the values of these features may appear in the reproductions in proportion to the respective probability distribution, or in proportion to a combination of the probability distributions of the features. Step 33 makes it possible to automatically control the manifestation of the deviation type among the reproductions, for example to ensure that the reproductions contain deviations in correspondence with real-world production in the manufacturing plant. This will improve the performance of $MLM_T$. Step 34 associates gradings with the reproductions, and step 35 inputs pairs of reproductions and gradings for training of the MLM.

To ensure that the reproductions correspond visually to the image data to be processed by $MLM_T$, step 33 may define a virtual camera position in the virtual coordinate system (x,y,z in FIG. 1a) in relation to the virtual model 201 so that a viewpoint of the reproduction corresponds to a viewpoint from the imaging device 302 onto the packaging containers 401 (or the starting material) in the manufacturing plant. Further, the reproductions may be produced to account for the lighting conditions at the imaging device 302, the surface structure of the material in the containers 401, coloring and/or patterning of the containers 401, etc. The reproductions may be produced by conventional ray casting or ray tracing, as well as rendering techniques that also account for diffraction, e.g. wave optics, GTD algorithms (Geometrical Theory of Diffraction), PTD algorithms (Physical Theory of Diffraction), etc.

The grading in step 34 may be performed by ocular inspection of the reproductions produced by step 33. However, step 34 may instead be automated and comprise mapping, for each reproduction, the feature values of the deviation in the reproduction to a grading database that associates gradings with feature values. This allows step 34 to automatically determine and assign, based on the mapping, a grading for the respective reproduction. The grading may indicate the magnitude (severity) of the current deviation for the appearance and/or function of the virtual model in the reproduction. The grading may be assigned in any number of gradings, levels or ranks. In one non-limiting example, the grading is binary and may designate the virtual model as being either acceptable or non-acceptable.

In the following, the method 30 in FIG. 3 will be further exemplified in relation to the use of a set of basis functions in step 33. The set of basis functions may have been pre-computed by use of any suitable basis function computation algorithm that renders linearly independent basis functions based on feature vectors representing a deviation type in a plurality of containers (or items of starting material). Examples of such computation algorithms include, without limitation, Principal Component Analysis (PCA), Independent Component Analysis (ICA), Wavelet analysis, Non-negative Matrix Factorization (NMF), Fourier analysis, Autoregression analysis, Factor Analysis, Common Spatial Pattern (CSP), Canonical Correlation Analysis (CCA), etc. Such computation algorithms define a model function for observations in terms a set of basis functions. Often a generic linear model function is assumed: $X=\Sigma(w_i \cdot \phi_i)$, where X is an observation or feature vector, $\phi_i$ is a respective basis function, and $w_i$ is a respective weight or basis function coefficient. The basis functions are linearly independent. For better conditioning, some computation algorithms may also impose orthogonality among the basis functions. In the following, examples will be given with respect to PCA, which is a statistical procedure that uses a transformation to convert a set of observations of correlated variables into a set of values of linearly uncorrelated basis functions called "principal components". The number of principal components is less than or equal to the number of original variables. The transformation is defined in such a way that the first principal component has the largest possible variance, i.e. accounts for as much of the variability in the data as possible, and each succeeding component in turn has the highest variance possible under the constraint that it is uncorrelated with the preceding components. Thus, PCA results in a number of principal components for the set of observations and a variance for each principal component. The variance is or corresponds to the above-mentioned weight for the respective basis function.

Figure 4A:
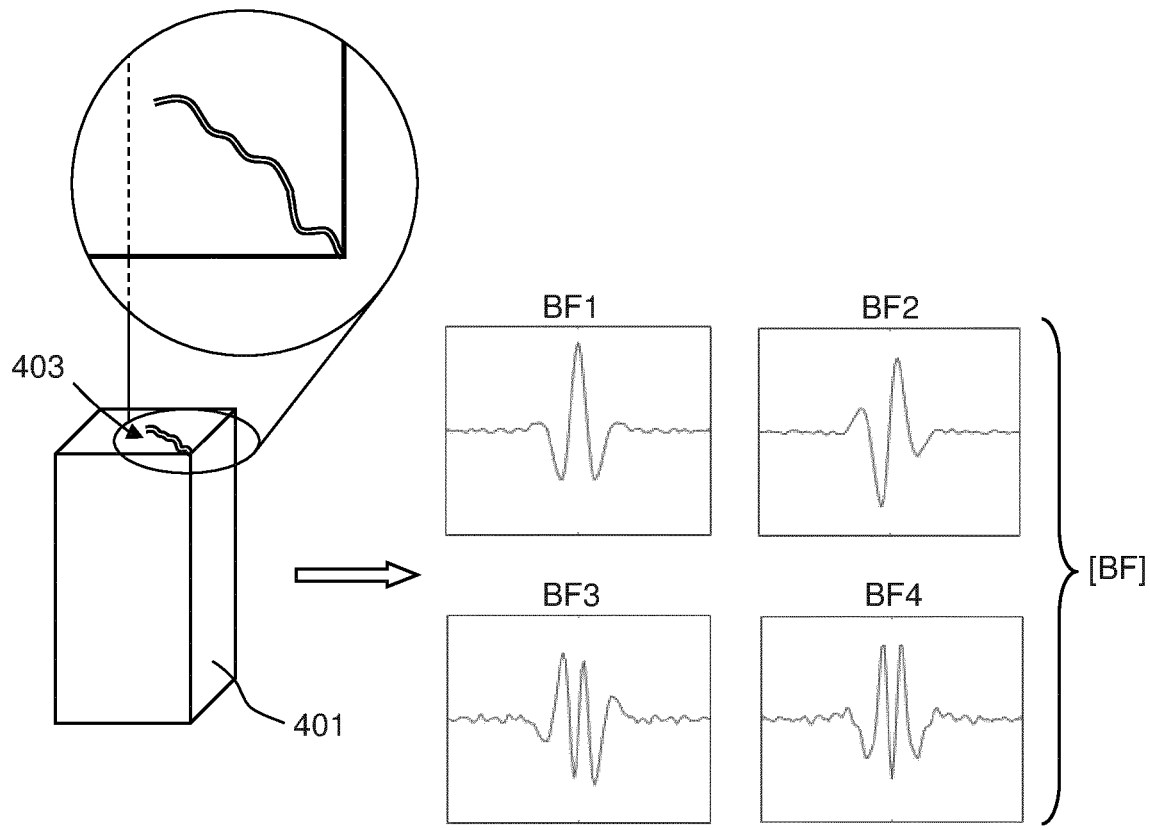
FIG. 4a shows an example of a set of basis functions for a specific deviation type.
Figure 4B:
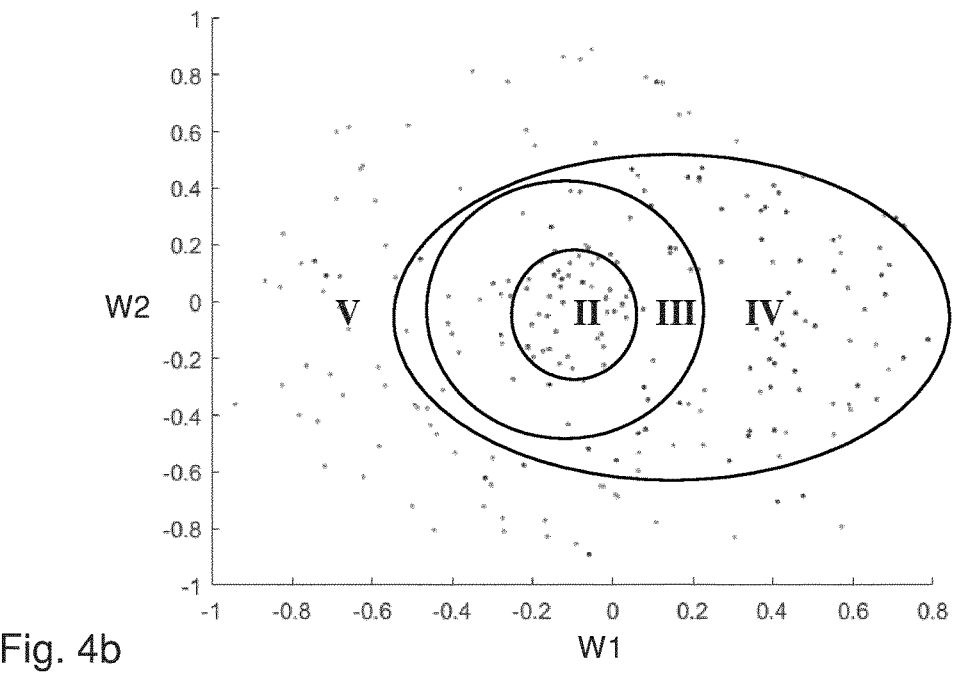
FIG. 4b is a scatter plot of first and second weight values determined for packaging containers having the specific deviation type and using two of the basis functions in FIG. 4b.

FIG. 4a illustrates a set of basis functions, [BF], that has been pre-computed for a specific deviation type by operating a PCA algorithm on a plurality of deviations 403 of a specific deviation type. Thus, the basis functions BF1-BF4 are principal components produced by the PCA algorithm. In this particular example, the feature vectors and the basis functions are one-dimensional and represent curvature at points along a line in the image data. FIG. 4b illustrates a weight space determined for basis functions BF1 and BF2 in FIG. 4a. The weight space is thus defined by a weight W1 for BF1, and a weight W2 for BF2. Each point in FIG. 4b is calculated for an example deviation of the deviation type. FIG. 4b also indicates grading regions in the weight space, where the different grading regions are assigned a respective grading II-V, where the magnitude of the deviation decreases from II to V. The grading has been determined by ocular inspection and manual grading of the deviation of the containers corresponding to the points in FIG. 4b. In this particular example, it is possible to assign a grading to the respective container based on the weights W1, W2.

In the same way that actual deviations may be represented by one or more weight values, it is equally possible to recreate a deviation based on one or more weight values and corresponding basis functions. Thus, given one or more weight values, step 33 is capable of defining the corresponding deviation, implement the deviation in the virtual model, and produce the reproduction. It is realized that the use of weights and basis functions enables step 33 to produce reproductions of all conceivable variations of a deviation type and with any number of different deviations for the deviation type.

Figure 4C:
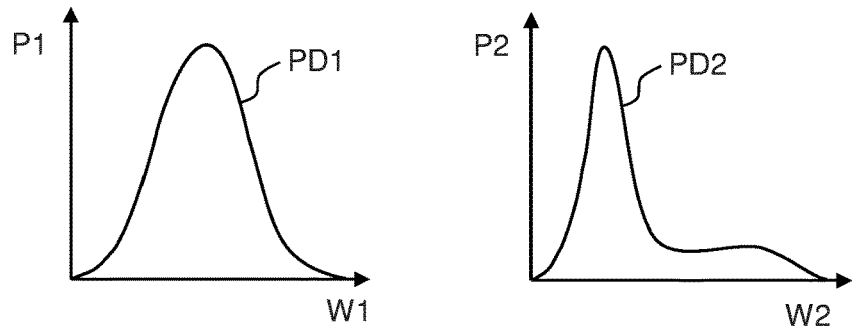
FIG. 4c shows two examples of probability density functions representing the occurrence of the first and second weight values in deviations among packaging containers.

FIG. 4c shows examples of probability distributions PD1, PD2 for the weights W1, W2. PD1 defines a probability value P1 for each value of weight W1, and PD2 defines a probability value P2 for each value of weight W2. The probability distributions PD1, PD2 are predetermined and may be theoretically or empirically estimated. In the illustrated example, PD1 is a Gaussian distribution, and PD2 is an asymmetric distribution skewed towards smaller W2 values. Many continuous and discrete probability distribution functions are known in the art and may be used in the method 30.

The provision of the probability distributions PD1, PD2 restricts the reproductions produced by step 33 to represent a likely outcome of actual deviations in the containers or the starting material in the manufacturing plant. The amount of training material for the MLM may thereby be restricted, leading to faster training. Further, the relevance of the training material may be ensured, leading to more accurate training.

Reverting to FIG. 3, and assuming that the deviation type is represented by the weights W1, W2, step 33 may comprise matching the occurrence of the values of W1, W2 in the reproductions to the probability values given by the probability distributions PD1, PD2, to determine pairs of values of W1, W2. For each pair of values W1, W2, step 33 computes a functional representation of the deviation. The functional representation may be or computed from a feature vector F, which is obtained by combining the basis functions BF1, BF2 scaled by the respective weight value: $F=W1 \cdot BF1+W2 \cdot BF2$. The functional representation thereby represents the deviation to be reproduced. Given the functional representation, step 33 adapts the virtual model to include the deviation, e.g. as exemplified in FIGS. 2b-2c, and produces the reproduction to mimic image data captured by the imaging device 302 (FIG. 1a).

The feature vector F is determined in the same format as the observations X that were used for computing the set of predefined basis functions. The feature vector F may represent the current deviation by a plurality of numeric values and may be given in one or more dimensions. In one embodiment, the feature vector F represents the geometry of the deviation, e.g. its shape and/or topography. As used herein, "topography" is the distribution of height values in relation to a geometric reference, e.g. a two-dimensional geometric plane. In the example of the deviation region 202 in FIGS. 2b-2c, the topography may designate the variations in height perpendicular to a geometric plane parallel to the top surface 203 of the virtual model 201. The topography may be represented as height values along a line, e.g. along a deviation, such as a wrinkle, or along a predefined reference line. Alternatively or additionally, the topography may be represented as a 2D distribution of height values. In a further example, the feature vector F may define the curvature at different locations within the deviation, e.g. along a line or in two dimensions. Any suitable definition of curvature may be used, including conventional measures of intrinsic and external curvature in two or three dimensions. In another example, the feature vector F may represent a computed difference, in one or more dimensions, between the image data and a reference template that corresponds to the virtual model without the deviation. It is also conceivable that the feature vector F comprises a combination of different metrics, e.g. any of the foregoing.

Figure 6:
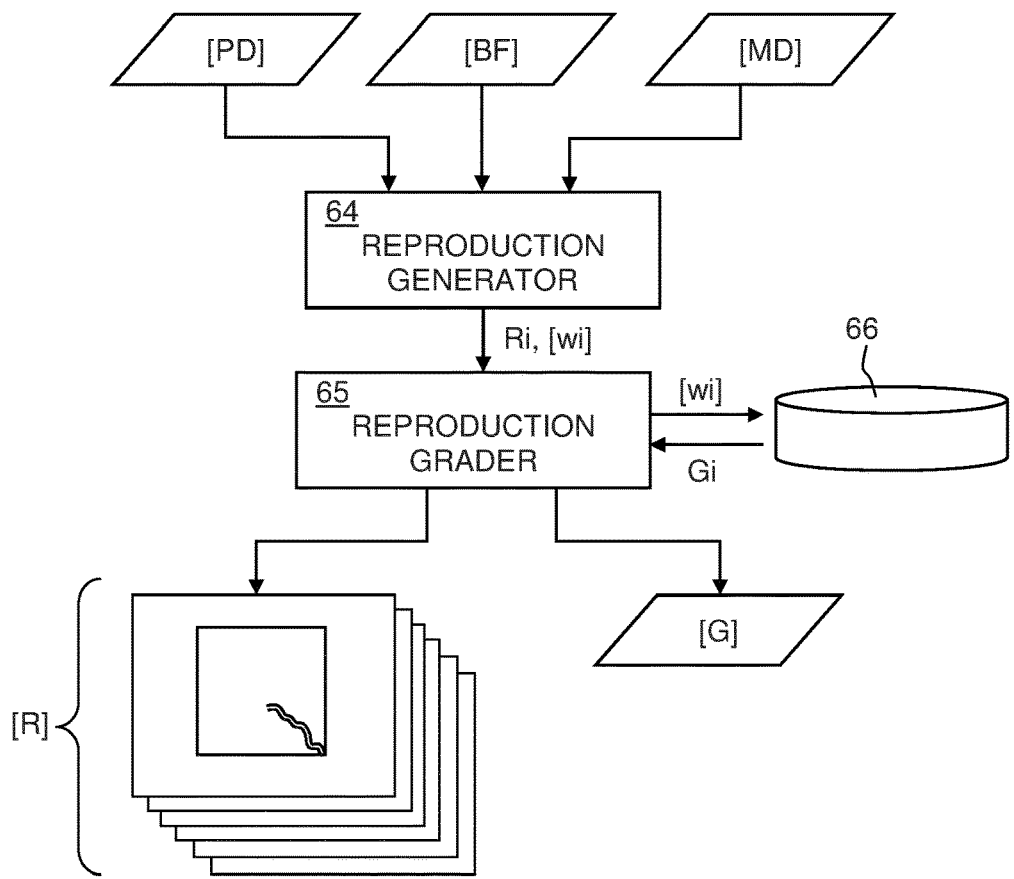
FIG. 6 is a functional block diagram of a device performing the training method of FIG. 3.

FIG. 6 illustrates a schematic structure of the training device 303 for performing steps 31-34 of method 30. In the illustrated embodiment, the structure comprises two modules: a reproduction generator 64 and a reproduction grader 65. The generator 64 is configured to obtain model data [MD] that defines the virtual model, a set of basis functions [BF] that represents the deviation type, and probability distribution data [PD] for the set of weights associated with the set of basis functions. Based on this input data, the generator 64 is configured to repeatedly select weight values [wi] and produce a reproduction Ri. The selected weight values [wi] are received by the grader 65, which is configured to map the weight values [wi] to a grading database 66, which associates gradings with weight values [wi]. For example, the grading database 66 may associate weight regions in a weight space with gradings, e.g. as exemplified in FIG. 4b. The grader 65 is thereby configured to determine and output a grading Gi for the reproduction Ri. The generator 64 and the grader 65 are repeatedly operated to produce the reproductions [R] and the gradings [G] for input to the MLM (FIG. 1b).

Figure 5:
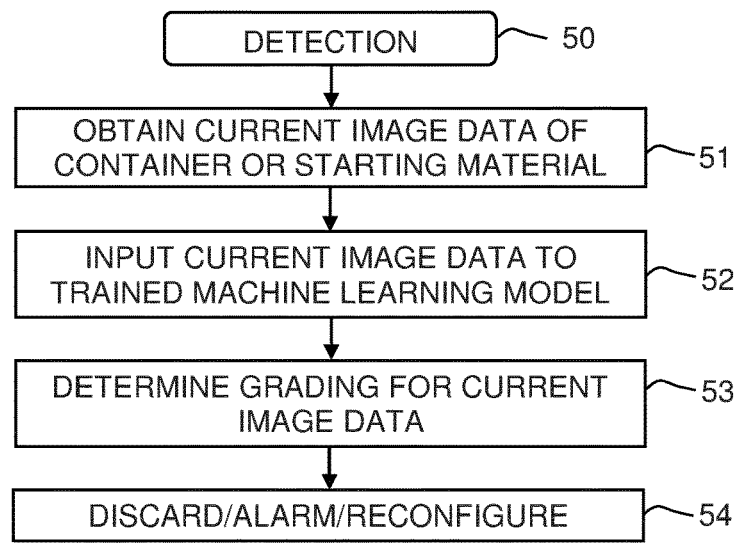
FIG. 5 is a flowchart of an example method for detection by use of a trained machine learning model.
Figure 7:
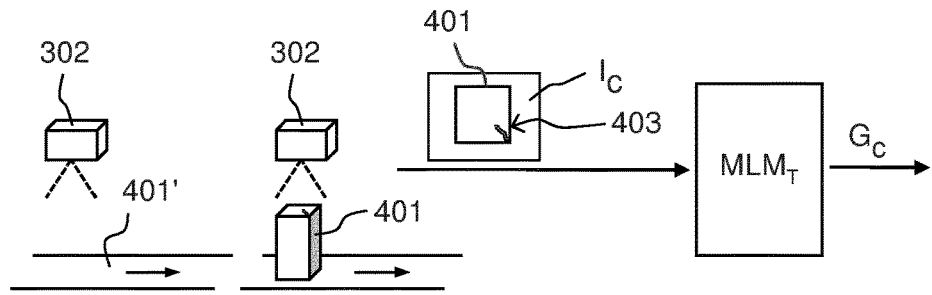
FIG. 7 is a schematic illustration of a system for deviation detection when operative in a manufacturing plant.

FIG. 5 illustrates a detection method 50, which may be performed by the monitoring device 301 in FIGS. 1a and 1c, e.g. in the context of a manufacturing plant as shown in FIG. 7. Step 51 obtains current image data Ic of a container 401 or a starting material 401' (illustrated as a sheet of packaging material in FIG. 7) from one or more imaging devices 302 in the manufacturing plant. In FIG. 7, the current image data Ic is exemplified by an image that depicts a current container 401 with a deviation 403. Step 52 inputs the current image data Ic to $MLM_T$. Step 53 operates $MLM_T$ on the current image data Ic to detect a deviation and determine a current grading Gi for the deviation, if present. Step 54 provides feedback to an operator and/or a control system in the manufacturing plant.

In one example, step 54 signals that the current container 401 or starting material 401' should be discarded. In another example, step 54 generates an alert notification indicative of a production error, and optionally causes one or more machines to be stopped. The alert notification may depend on and/or be indicative of the current grading Gc and/or the deviation type. In a further example, step 54 causes or facilitates a reconfiguration of one or more machines in the manufacturing plant. In one such embodiment, step 54 comprises a sub-step of determining a time stamp for a current deviation. Optionally this sub-step may be performed only if the current grading Gc exceeds a grading limit. The time stamp may be given with reference to a master clock within the manufacturing plant. Step 54 may further comprise a sub-step of determining, based on the time stamp, associated production parameters of the manufacturing plant. Accordingly, when the current deviation is detected and the associated time stamp is defined, step 54 is configured to obtain production data comprising parameters of the production process at or before the time stamp. The production data may be obtained from a control system in the manufacturing plant. The production parameters may comprise any parameter associated with the chain of the production of the packaging containers 401, such as settings and/or sensor data in one or more machines, and/or properties of the starting material 401' or the liquid food to be sealed therein. Step 54 may comprise a further sub-step of correlating the time stamp, the current grading Gc and the deviation type with the production parameters. By this correlation, step 54 is capable of accurately characterizing the origin and circumstances of the formation of the current deviation. This allows facilitated optimization of the production line and provides a reliable tool for deviation detection. In one embodiment, step 54 may further communicate control instructions to a machine in the production plant comprising modified production parameters according to the current grading Gc and/or the deviation type.

Figure 8:
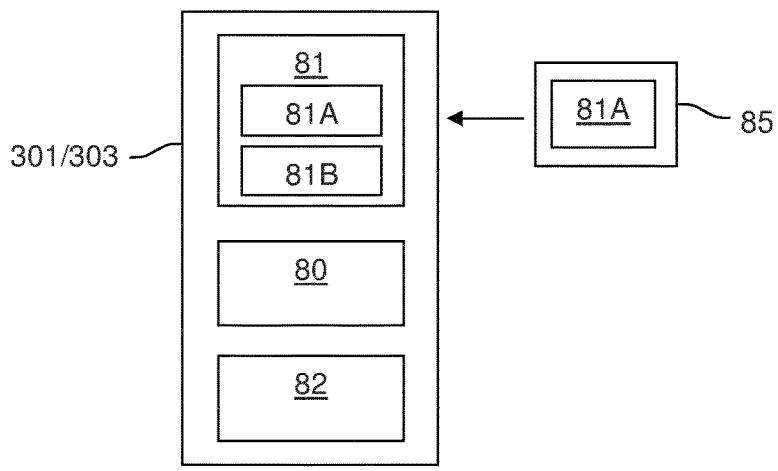
FIG. 8 is a block diagram of a device that may implement methods in accordance with some embodiments of the present disclosure.

FIG. 8 is a block diagram of an example structure of the training device 303 in FIGS. 1a and 1b or the monitoring device 301 in FIGS. 1a and 1c. In the illustrated example, the device 301/303 comprises a processing system 80 and a memory 81. The processing system 80 may include any commercially available processing device, such as a CPU, DSP, GPU, microprocessor, ASIC, FPGA, or other electronic programmable logic device, or any combination thereof. The processing system 80 may be configured to read executable computer program instructions 81A from the memory 81 and execute these instructions to control the operation of the device 301/303, e.g. to perform any of the methods described herein. The program instructions 81A may be provided to the device 301/303 on a computer-readable medium 85, which may be a tangible (non-transitory) product (e.g. magnetic medium, optical disk, read-only memory, flash memory, etc) or a transitory product, such as a propagating signal. The memory 81 may be, for example, one or more of a buffer, a flash memory, a hard drive, a removable media, a volatile memory, a non-volatile memory, a random access memory (RAM), or other suitable device. As indicated in FIG. 8, the memory 81 may also store data 81B for use by the processing system 80, e.g. the grading database 66, [BF], [PD], [MD], MLM, $MLM_T$, etc. The device 301/303 further comprises one or more communication interfaces 82 for operatively connecting the device 301/303 to an external device by wire or wirelessly, e.g. to receive the image data from the imaging device(s) 302, to provide the alert notification and/or control instructions, to obtain/provide $MLM_T$, etc.

The invention claimed is:

1. A method of detecting deviations in packaging containers for liquid food in a manufacturing plant, said method comprising:
   creating a virtual model of a packaging container or of a starting material for use in producing the packaging container;
   obtaining one or more probability distributions for features that are characteristic of a deviation type;
   producing reproductions of the virtual model with deviations of the deviation type, wherein said deviations are included among the reproductions in correspondence with the one or more probability distributions for the features;
   associating gradings with the reproductions; and
   inputting the reproductions and the associated gradings for training of a machine learning-based model for subsequent detection and grading of an actual deviation in the packaging containers or the starting material, based on image data of the packaging containers or the starting material acquired in the manufacturing plant.

2. The method of claim 1, wherein the one or more probability distributions define probability values for feature values of a respective feature that is characteristic of the deviation type.

3. The method of claim 2, wherein said producing further comprises: matching an occurrence of a feature value of the respective feature among the reproductions to a corresponding probability value given by the one or more probability distributions.

4. The method of claim 1, wherein the features comprise one or more weights of a set of predefined basis functions for the deviation type.

5. The method of claim 4, wherein said producing further comprises: determining, as a function of the one or more probability functions, a respective weight value for predefined basis functions in the set of predefined basis functions; and combining the predefined basis functions scaled with the respective weight value to generate a functional representation of a deviation to be included among the reproductions, and adapting the virtual model to the functional representation to include the deviation.

6. The method of claim 5, wherein the predefined basis functions in the set of predefined basis functions are linearly independent and/or mutually orthogonal.

7. The method of claim 4, wherein the predefined basis functions in the set of predefined basis functions correspond to principal components given by Principal Component Analysis, PCA.

8. The method of claim 1, wherein each of the deviations is defined by one or more feature values of said features, wherein said associating comprises, for a respective reproduction, mapping the one or more feature values to a grading database that associates gradings with feature values, and determining, based on the mapping, a grading for the respective reproduction.

9. The method of claim 1, wherein the virtual model is created in a virtual coordinate system, wherein said producing further comprises: defining a deviation region on the virtual model, introducing a controlled deviation in the deviation region with a defined geometry and a location in the virtual coordinate system to represent one or more of the features that are characteristic of the deviation type; and producing a reproduction of the virtual model with the controlled deviation.

10. The method of claim 9, further comprising defining a virtual camera position in the virtual coordinate system in relation to the virtual model so that a viewpoint of the reproduction corresponds to a viewpoint from a camera position onto the packaging containers or the starting material for said subsequent detection at the manufacturing plant.

11. The method of claim 1, further comprising: determining a time stamp for the actual deviation; determining, based on the time stamp, associated production parameters of the manufacturing plant, and correlating the time stamp, the grading and the deviation type with the production parameters.

12. The method of claim 11, further comprising: communicating control instructions to a machine in the manufacturing plant comprising modified production parameters according to the grading and/or the deviation type.

13. The method of claim 1, further comprising: causing an alert notification as a function of the grading.

14. A computer readable medium comprising computer instructions which, when executed by a processor, causes the processor to perform the method according to claim 1.

15. A system for detecting deviations in packaging containers for liquid food produced in a manufacturing plant, said system comprising a processor configured to perform the method according to claim 1.

* * * * *